(12) United States Patent
Mormino et al.

(10) Patent No.: US 8,110,103 B2
(45) Date of Patent: Feb. 7, 2012

(54) FLOW-CONTROL SUPPORTS FOR DISTRIBUTOR PLATES IN COMPOSITE PRESSURE VESSEL ASSEMBLIES

(75) Inventors: Michael P. Mormino, Aurora, OH (US); Douglas S. Stolarik, Mentor, OH (US); Richard A. Mest, Phoenixville, PA (US); Douglas M. Horner, Gates Mills, OH (US)

(73) Assignee: Enpress LLC, Eastlake, OH (US)

( * ) Notice: Subject to any disclaimer, the term of this patent is extended or adjusted under 35 U.S.C. 154(b) by 392 days.

(21) Appl. No.: 12/398,781

(22) Filed: Mar. 5, 2009

(65) Prior Publication Data
US 2009/0166273 A1 Jul. 2, 2009

Related U.S. Application Data

(63) Continuation-in-part of application No. 11/834,151, filed on Aug. 6, 2007, now Pat. No. 7,901,576.

(51) Int. Cl.
*B01D 24/12* (2006.01)
*B01D 24/46* (2006.01)

(52) U.S. Cl. ........ 210/280; 210/283; 210/288; 210/289; 210/291; 248/94; 248/163.1; 239/275; 239/498; 239/504

(58) Field of Classification Search .................. 210/276, 210/279, 280, 283, 284, 289, 304, 512.1, 210/288, 291; 366/317, 338; 248/94, 163.1, 248/440.1; 239/275, 498, 504
See application file for complete search history.

(56) References Cited

U.S. PATENT DOCUMENTS

| 3,534,856 | A | | 10/1970 | Marsh |
|---|---|---|---|---|
| 3,557,827 | A | | 1/1971 | Marsh |
| 3,662,780 | A | | 5/1972 | Marsh |
| 4,228,000 | A | | 10/1980 | Hoeschler |
| 4,312,751 | A | * | 1/1982 | Casamitjana ................... 210/94 |
| 5,089,140 | A | | 2/1992 | Brane et al. |
| 5,147,530 | A | | 9/1992 | Chandler et al. |
| 5,157,979 | A | | 10/1992 | Brane et al. |
| 5,378,370 | A | | 1/1995 | Brane et al. |
| 6,887,373 | B2 | | 5/2005 | McCoy |
| 7,025,880 | B2 | | 4/2006 | Lamb |
| 7,354,495 | B2 | | 4/2008 | Carter et al. |
| 2003/0136720 | A1 | | 7/2003 | Lamb |
| 2006/0060289 | A1 | | 3/2006 | Carter et al. |

FOREIGN PATENT DOCUMENTS

| DE | 1945659 A1 | 3/1971 |
|---|---|---|
| WO | 00/66264 | 11/2000 |
| WO | 03/031860 A1 | 4/2003 |

\* cited by examiner

*Primary Examiner* — Matthew Savage
(74) *Attorney, Agent, or Firm* — Rankin, Hill & Clark LLP (57) ABSTRACT

The present invention provides a flow-control support for a distributor plate in a composite pressure vessel. The distributor plate includes a thermoplastic polymeric disk having a top side, a bottom side, a perimeter edge and a central opening and a plurality of fluid flow passages through the disk. The flow-control support is disposed between the bottom side of the disk and an inner side of an end of a thermoplastic liner assembly. The flow-control support includes a spirally fluted upper surface that is adapted to direct fluid flowing from a supply pipe disposed in the central opening of a distributor plate that is supported by the flow control support such that the fluid swirls in a space between the bottom side of the distributor plate and an inner side of an end portion of a water treatment vessel. The swirling water insures that fluid is distributed to substantially all of the fluid flow passages through the disk during backwashing operations.

20 Claims, 9 Drawing Sheets

FLOW-CONTROL SUPPORTS FOR DISTRIBUTOR PLATES IN COMPOSITE PRESSURE VESSEL ASSEMBLIES

CROSS-REFERENCE TO RELATED APPLICATIONS

This application is a continuation-in-part of U.S. application Ser. No. 11/834,151, filed Aug. 6, 2007, now U.S. Pat. No. 7,901,576.

BACKGROUND OF INVENTION

1. Field of Invention

The present invention relates to flow-control supports for distributor plates in composite pressure vessels, composite pressure vessels that include a flow-control support, methods for manufacturing composite pressure vessels and methods for preparing composite pressure vessels for use in water treatment applications.

2. Description of Related Art

Composite pressure vessels are used in a variety of applications including, for example, in the treatment and/or conditioning of water (e.g., water softeners). Composite pressure vessels used in such applications typically comprise an elongate thermoplastic liner or tank that has been over-wrapped with a reinforcing layer. The elongate thermoplastic liner is typically formed of one or more olefin polymers such as polypropylene and/or polyethylene, and is fabricated into a tank structure using a blow molding, rotational molding, spin welding or other thermoplastic fabrication process. The reinforcing layer typically comprises glass filaments that are wrapped helically and circumferentially around the thermoplastic liner. The glass filaments are typically consolidated together and adhered to the thermoplastic liner using a thermosetting epoxy composition but, as disclosed in Carter et al., Pub. No. US 2006/0060289 A1, can be consolidated and adhered to the thermoplastic liner using commingled thermoplastic fibers.

In many prior art water treatment system applications, a dip tube (also sometimes referred to in the art as a distributor pipe or a supply pipe) having a distributor basket attached at one end is inserted through an aperture in a top end of the composite pressure vessel such that the distributor basket is disposed proximal to the bottom end of the composite pressure vessel. Examples of water treatment systems of this type are disclosed in Hoeschler, U.S. Pat. No. 4,228,000, Chandler et al., U.S. Pat. No. 5,147,530 and McCoy, U.S. Pat. No. 6,887,373 B2. The distributor basket in such prior art devices generally includes a plurality of narrow slits, which allow water that has flowed through water treatment media disposed in the composite pressure vessel and thereby treated to flow out of the pressure vessel through the dip tube. The slits are dimensioned to prevent water treatment media from flowing into the dip tube with the treated water. During initial assembly of such devices, once the dip tube is properly positioned within the composite pressure vessel, water treatment media is placed into the composite pressure vessel to surround the distributor basket and dip tube and hold it in position. The open end of the dip tube is then attached to a valve assembly, which is secured to the top end of the composite pressure vessel to seal off the aperture. Water to be treated is pumped into the top of the composite pressure vessel, where it flows through the water treatment media and is thereby treated. The treated water flows from the water treatment media to the distributor basket, where it passes through the slits in the distributor basket and back out of the composite pressure vessel through the dip tube to the valve assembly coupled thereto. Periodically, the flow of water is reversed to back wash and thereby condition the water treatment media.

Occasionally, it is necessary to service a composite pressure vessel (e.g., to add new water treatment media). In many cases, removal of the valve assembly disturbs the position of the dip tube. Water treatment media can settle beneath the disturbed distributor basket, making it difficult to re-secure the valve assembly to the top end of the composite pressure vessel and thus close the aperture. When this occurs, water is usually pumped at high pressure through the dip tube to flush the water treatment media away from the distributor basket until the dip tube can be properly repositioned in the water treatment media. Water pumped into the opened composite pressure vessel during this procedure flows out of the composite pressure vessel and onto the floor, where it creates a mess that can cause damage to the building structure in which the composite pressure vessel is installed. It also disturbs the water treatment media within the composite pressure vessel, which can adversely affect future water treatment performance.

Carter et al., U.S. Pat. No. 7,354,495, discloses a composite pressure vessel that utilizes one or more distributor plates (sometimes referred to therein as separators and/or fluid diffusers) instead of a distributor basket to prevent water treatment media from flowing into the dip tube during water treatment operations. The distributor plates divide the pressure vessel into regions and support the water treatment media within the composite pressure vessel. As noted in Carter et al., the distributor plates can be laser welded to the thermoplastic liner of the composite pressure vessel or can be mechanically fixed to structures within the interior of the composite pressure vessel. Prior art distributor plates have generally utilized mesh screens to prevent water treatment media from flowing through the distributor plate.

BRIEF SUMMARY OF THE INVENTION

The present invention provides a flow-control support for a distributor plate in a composite pressure vessel. The distributor plate comprises a thermoplastic polymeric disk having a top side, a bottom side, a perimeter edge and a central opening. In a preferred embodiment, the disk is provided with a plurality of radial slits, which define fluid flow passages through the disk between the central opening and the perimeter edge. The fluid flow passages through the disk are adapted to swirl fluid flowing through the disk such that it swirls around the central opening. The flow-control support is disposed between the bottom side of the distributor plate and an inner side of an end of a thermoplastic liner assembly. The flow-control support includes a spirally fluted upper surface that is adapted to direct fluid flowing from a supply pipe disposed in the central opening of a distributor plate that is supported by the flow control support such that the fluid swirls in a space between the bottom side of the distributor plate and an inner side of an end portion of a water treatment vessel. The swirling water insures that fluid is distributed to substantially all of the fluid flow passages through the disk. This can be highly advantageous, particularly during water treatment media backwashing operations.

In one embodiment of the invention, the perimeter edge of the distributor plate is secured to a first thermoplastic domed end cap of a thermoplastic liner assembly. A supply pipe having a fitting attached at one end is engaged with and retained by an upper retaining ring at the central opening of the disk. The distributor plate can be used to support water treatment media. During water treatment operations, water flows through the water treatment media and through the disk from the top side to the bottom side. The radial slits in the disk promote near-fractal distribution of the water through the water treatment media. During backwashing operations, water pumped through the supply pipe is directed outwardly by the flow-control support where it diffuses through the radial slits in the distributor plate from the bottom side to the top side. The distributor plate causes the backwash water to swirl around the central opening and the supply pipe secured thereto. The swirling action of the backwash water through the water treatment media ensures that the backwashing water makes optimal contact with the water treatment media, thereby conditioning all of the water treatment media and ensuring that it remains properly distributed within the composite pressure vessel. It will be appreciated that in some water treatment systems, the flow directions are reversed (i.e., the service flow direction and the backwashing flow directions are the opposite as just described).

In another embodiment of the invention, one or more second distributor plates are secured to the cylindrical side walls of the thermoplastic liner of the composite pressure vessel. The second distributor plates can support a water treatment media that is different in composition than the water treatment media supported by the first distributor plate. In addition, the present invention also provides methods for manufacturing composite pressure vessels and methods for preparing composite pressure vessels for use in water treatment applications.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
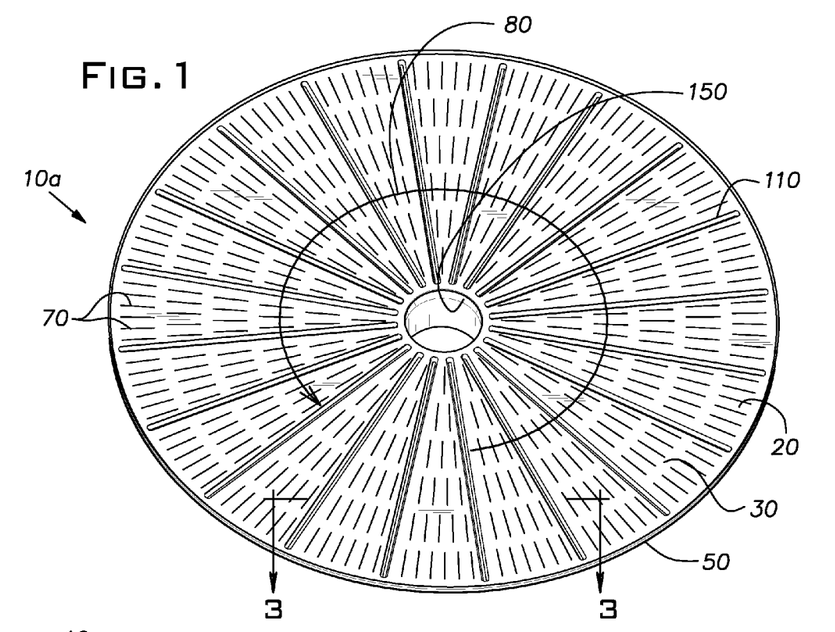
FIG. 1 is a perspective view showing a top side of an exemplary distributor plate according to the present invention.
Figure 2:
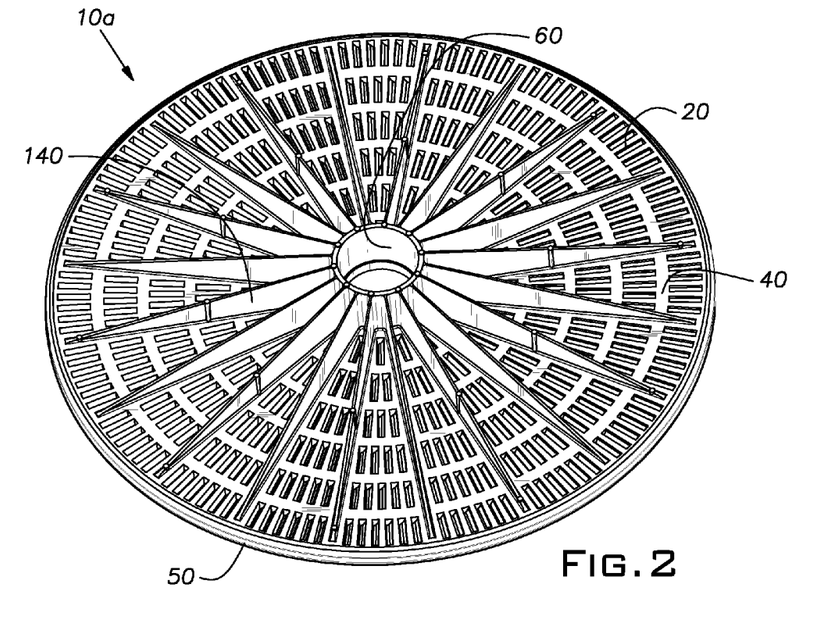
FIG. 2 is a perspective view showing a bottom side of the distributor plate shown in FIG. 1.
Figure 3:
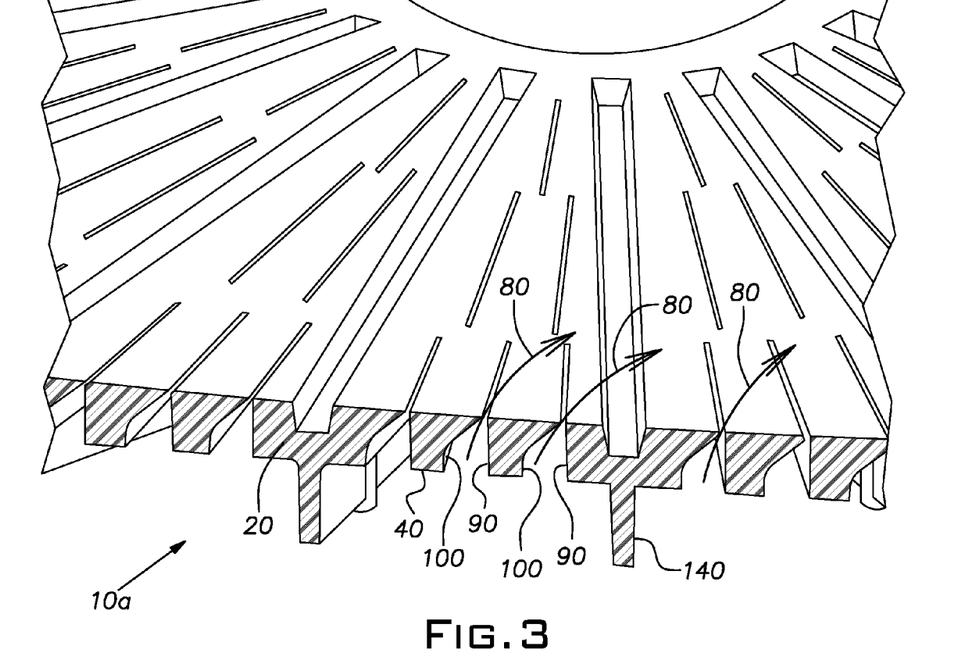
FIG. 3 is an enlarged section view of a portion of the distributor plate shown in FIG. 1 taken along the line III-III.

FIGS. 1-3 show views of an exemplary distributor plate 10a for a composite pressure vessel. The distributor plate 10a comprises a thermoplastic polymeric disk 20 having a top side 30, a bottom side 40, a perimeter edge 50 and a central opening 60. Fluid flow passages must be provided through the disk 20 to allow fluid to pass from the top side 30 to the bottom side 40 through the disk 20 and vice versa.

In the embodiment illustrated in FIGS. 1-3, radial slits 70 are formed in the disk 20 to define fluid flow passages through the disk 20 between the central opening 60 and the perimeter edge 50. The radial slits 70 are arranged in a plurality of concentric rings around the circumference of the central opening 60. The width of the radial slits 70 at the top side 30 of the disk 20 is not per se critical, but will be selected in view of the size of the water treatment media to be supported on the distributor plate 10a. Radial slits 70 having a width at the top side 30 of the disk 20 of about 0.006" (0.15 mm) are presently preferred for use in water treatment vessel applications.

The top side 30 of the distributor plate is adapted to support water treatment media thereon. During water treatment operations, water flows through the water treatment media and then through the disk 20 from the top side 30 to the bottom side 40 through the fluid flow passages. In the illustrated embodiment, the radial slits 70 are distributed around the central opening 60 in the disk 20 in such a way that the water being treated generally flows in a straight line downwardly through the bulk of water treatment media supported by the top side 30 of the disk 20 before it passes through the radial slits 70. The radial slits 70 in the disk 20 promote near-fractal distribution of the water through the water treatment media. This prevents "coning", which is a problem in many prior art water treatment vessels. The term "coning" refers to the path water being treated in conventional water treatment vessels tends to take through the water treatment media toward the distributor basket attached to the end of the dip tube. "Coning" is disadvantageous because only a portion of the water treatment media is used to treat the water. Distributor plates with radial slits 70 eliminate "coning" and provide substantial improvements (typically >15%) in water treatment media bed life.

Preferably, the fluid flow passages through the disk 20 are also adapted to swirl fluid flowing through the disk from the bottom side 40 to the top side 30 around the central opening 60, such as indicated by the flow arrows 80 in FIGS. 1 and 3. The fluid is preferably swirled around the central opening 60 in a counter-clockwise direction. This is highly advantageous during backwashing operations in which backwashing fluid is pumped through the supply pipe to flow upwardly through the water treatment media, thereby reconditioning the water treatment media. Ideally, the backwashing fluid flows evenly through the radial slits 70 and through the entire bulk of the water treatment media supported by the top side 30 of the disk. The swirling action of the water improves backwashing efficiency and further serves to reduce the likelihood of "coning".

The improvements in backwashing efficiency provide significant benefits in water treatment applications. In conventional water treatment applications (e.g., water softeners), a backwash flow rate of about 3 gallons of water per minute is typically required for a period of about 20 minutes in order to recondition the water treatment media. This results in about 60 gallons of regenerative chemical and salt-laden backwash water being discharged into a municipal sewer system or a septic system each time the water treatment media is reconditioned. The backwashing efficiency provided by distributor plates provided with radial slits permits a much lower backwashing flow rate to be used (e.g., about 1.5 gallons per minute) over the same or reduced period of time, which significantly reduces the amount of regenerative chemical and salt-laden backwash water discharged from the system during backwashing operations. It also reduces the amount of regenerative chemicals that must be used during the backwashing operations, and the amount of salt that is lost during backwashing operations. Over the lifetime of the water treatment apparatus, the present invention can save tens of thousands of gallons of water and significant quantities of regenerative chemicals and salt from being discharged into the environment as compared to conventional water treatment devices.

There are three factors that are likely responsible for the improvements in backwash flow rates and backwash efficiency provided by the present invention. The first factor is that there are fewer radial slits 70 (i.e., flow passages) provided through the disk 20 near the central opening 60 (through which a supply pipe 170 passes) than there are near the perimeter 50 of the disk 20. Fluids take the path of least resistance, and thus by managing the amount of open areas through the disk it is possible to direct or focus the flow of fluid across the disk 20 and thereby obtain near fractal distribution of the fluid through the entire disk 20. The second factor is the near perfect distribution of fluid flowing upwardly through the disk 20 and substantially uniformly across the entire surface of the disk 20 through the filter bed/media during backwashing operations. This essentially "uniformly fluidizes" the filter entire filter bed/media, even at dramatically reduced backwash flow rates as compared to conventional rates. Conventional backwash flow rates must be kept comparatively higher in order to have any possibility of breaking up cone and gravel distribution schemes caused by flow channeling through the media. The third factor is the angled flow emitted from each radial slot 70. The angled or swirling flow effectively lifts and rotates the entire filter bed during backwashing operations, which eliminates channeling through the media.

It will be appreciated that in some water treatment systems, the fluid flow directions are reversed (i.e., the service flow direction and the backwashing flow directions are the opposite as heretofore described). The invention provides advantages in both flow directions.

The diameter of the distributor plate 10a is not per se critical, but will be selected in view of the diameter of a domed end cap 120 or the inner diameter of the cylindrical side wall 200 of the thermoplastic cylinder 130 to which the perimeter 50 of the distributor plate 10a is to be fused. The disk 20 should have a thickness sufficient to support water treatment media without deforming. It will be appreciated that composite pressure vessels having a larger diameter will generally need a stronger, thicker disk 20 than vessels having a smaller diameter. For most water treatment applications, a thickness of about 0.2" (5 mm) is considered sufficient. The thickness of the disk 20 can be reduced through the use of a flow-control support, as discussed in greater detail below.

There are several ways in which fluid flowing through the fluid flow passages in the disk 20 from the bottom side 40 to the top side 30 can be encouraged to swirl around the central portion 60 of the distributor plate 10a. For example, the fluid flow passages can have the same width as they pass through the thickness dimension of the disk 20, but be made to pass through the disk 20 at an angle other than a right angle with respect to the top side 30 (not shown). However, in view of the preferred very narrow width of the radial slit 70 openings in the top side 30 of the disk 20, this is not preferred.

More preferably, each of the radial slits 70 that define a fluid flow passage through the disk 20 is narrower in width at the top side 30 of the disk 20 than at the bottom side 40 of the disk 20. Thus, each of the fluid flow passages through the disk 20 is bounded by a first longitudinal sidewall 90 and a second longitudinal sidewall 100. The first longitudinal sidewall 90 is preferably substantially perpendicular to the top side 30 of the disk 20. However, the second longitudinal sidewall 100 has a concave profile in cross-section. As fluid is pumped through the fluid flow passages in the disk 20, the fluid follows along the contour of the concave second longitudinal sidewall 100 at a higher rate of speed that water flowing along the first longitudinal sidewall 90, thus causing the water to exit through the radial slit 70 at the top side 30 of the disk 20 in a direction other than perpendicular to the top side 30 of the disk 20. Because the radial slits 70 are arranged circumferentially around the disk 20, the radial slits 70 collectively serve to impart a swirling motion to fluid flowing through the fluid flow passages in the disk 20.

It will be appreciated that the second longitudinal sidewall 100 need not have a concave profile in cross-section, as illustrated in FIG. 3. Alternatively, the second longitudinal sidewall could have a planar profile in cross-section, which is angled with respect to the first longitudinal sidewall 90. Alternatively, the second longitudinal sidewall could have a convex profile in cross-section. But, a concave profile in cross-section is preferred.

Preferably, the top side 30 of the disk 20 is provided with a plurality of drive lugs 110, which are adapted to engage with fins extending from the face of a chuck of a spin-welding machine (not shown). The fins of the chuck extend into the drive lugs 110 when the disk is pressed thereon. The fins grip the drive lugs 110, allowing the distributor plate 10a to be temporarily rotated at high speed while the perimeter edge 50 is in frictional contact with an inner side of a thermoplastic domed end cap 120 (shown in FIG. 7) before the thermoplastic domed end cap 120 is spin-welded to the end of a thermoplastic cylinder 130 (shown in FIG. 7) or in contact with an inner side 200 of the thermoplastic cylinder 130. The temporary high speed rotation and frictional contact between the perimeter 50 of the disk 20 and the inner side of thermoplastic domed end cap 120 or the inner side 200 of the thermoplastic cylinder 130 causes the perimeter 50 of the disk 20 to rapidly heat up, melt and fuse the perimeter 50 of the disk 20 to the inner side of the thermoplastic domed end cap 120 or the inner side 200 of the thermoplastic cylinder 130. Ideally, the perimeter edge 50 of the disk 20 should have a profile adapted to maximize fusion between the two surfaces during spin-welding.

Figure 12:
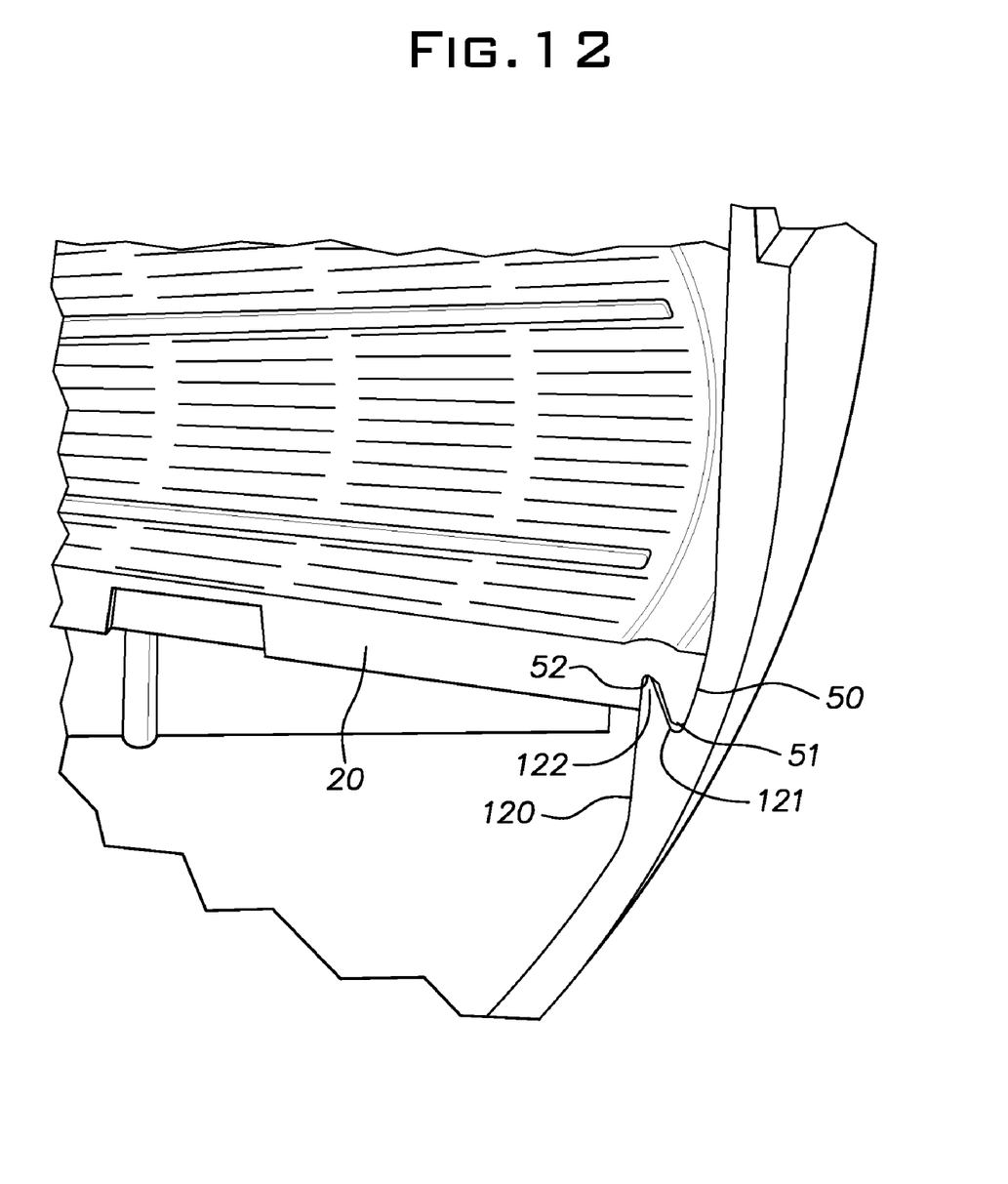
FIG. 12 is a perspective view of a section taken through the middle of an alternative embodiment for connecting a distributor plate to an inner side of a thermoplastic end cap.

It will be appreciated that the perimeter 50 of the disk 20 could be secured to the thermoplastic domed end cap or other portion of the inner side 200 of the thermoplastic cylinder 130 by other conventional welding means including laser welding, such as is taught in Carter et al., Pub. No. US 2006/0060289 A1. FIG. 12 shows a perspective view of a section taken through the middle of an alternative embodiment for connecting the perimeter 50 of the disk 20 to the inner side of the thermoplastic domed end cap 120. In the embodiment illustrated in FIG. 12, the outer edge of the disk 20 features a "tongue" portion 51 and, spaced inwardly thereof, a "groove" portion 52. The "tongue" portion 51 is adapted to be received within a "groove" 121 formed in the inner sidewall of the thermoplastic domed end cap 120. A "lip" portion 122 inward of the "groove" 121 is received in the "groove" portion 52 of the disk 20. The utilization of "tongues" and "grooves" causes the disk 20 and end cap 120 to fit together easily. In addition, there is a reduced creation of flash during the welding of the parts and the disk 20 is consistently located in the proper place within the vessel. Furthermore, the post-spin-welded parts tend to be stronger.

In a preferred embodiment of the invention, the distributor plate 10a further comprises a plurality of radial reinforcing fins 140, which extend from the bottom side 40 of the disk 20 between the perimeter edge 50 and the central opening 60 through the disk 20. The radial reinforcing fins 140 need not be linear, but can spiral away from the central opening 60 to further impart swirling motion to the fluid during backwashing operations. The central opening 60 through the disk 20 is preferably bounded by a collar having a height that is greater than the thickness dimension of the disk 20 at the perimeter edge 50. Thus, the radial reinforcing fins 140 attached to an outer side of the collar taper as they extend from the collar toward the perimeter edge 50.

Figure 4:
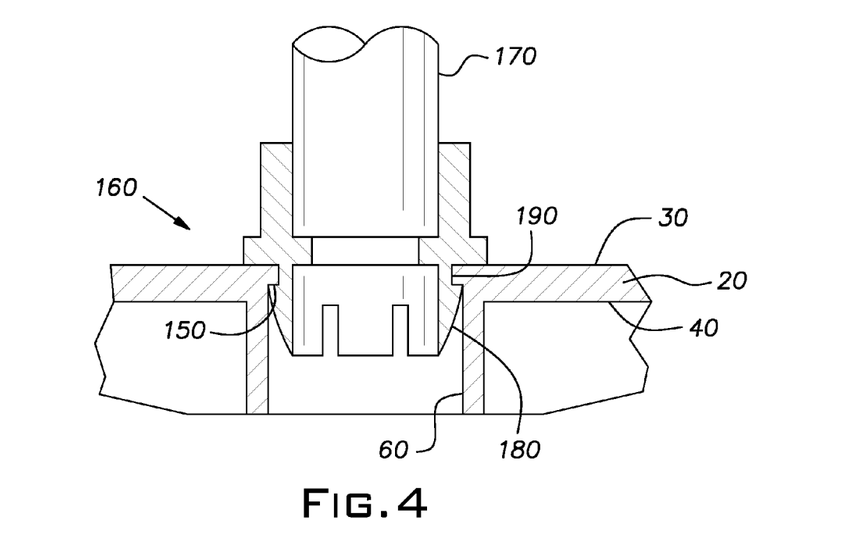
FIG. 4 is a front section view taken through the center of a snap fitting according to the invention engaged with an upper retaining ring of a distributor plate.
Figure 7:
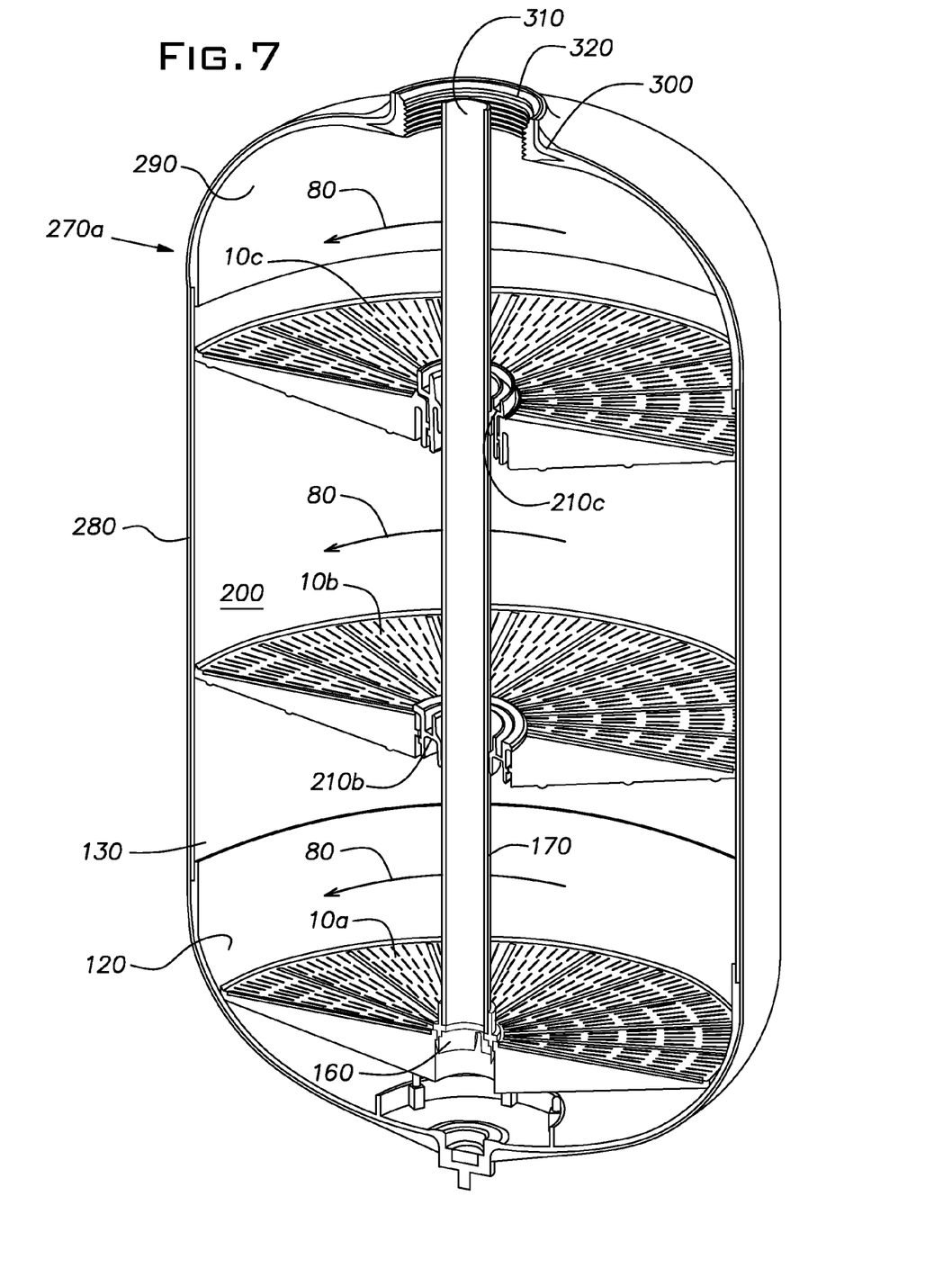
FIG. 7 is a perspective view showing the front of a section taken through the longitudinal axis of an exemplary composite pressure vessel according to the invention.

An upper retaining ring 150 is preferably provided about the central opening 60 for engaging a fitting such as, for example, a snap-fitting 160 (shown in FIG. 4) attached to an end of a supply pipe 170 (shown in FIG. 7). The snap-fitting 160 includes a plurality of deflectable tabs 180, which deflect inwardly as the snap-fitting 160 is pressed into the central opening 60 in the disk 20. The deflectable tabs 180 are biased to spring back after they pass the upper retaining ring 150, thereby capturing the upper retaining ring 160 in a channel 190 formed in the snap-fitting 160. Engagement of the snap-fitting to the disk 20 is substantially permanent. It takes more force to withdrawn the snap-fitting 160 from the disk 20 than is customarily applied to the supply pipe 170 during servicing of the composite pressure vessel. Thus, composite pressure vessels can be serviced without concern that the supply pipe 170 will become dislodged or otherwise displaced with respect to the disk 20. It will be appreciated that other fittings, such as tongue and groove or bayonet locking adapters could be used.

In some applications, it may be desirable to spin-weld or laser weld one or more second distributor plates 10b, 10c (etc.) to an inner side wall 200 of a thermoplastic cylinder 130 (see FIG. 7) above the first distributor plate 10a (or in place of the first distributor plate 10a). The second distributor plates 10b, 10c (etc.) can also be used to support water treatment media, which may be the same or different than the water treatment media supported by the first distributor plate 10a. Compartmental separation of different types of water treatment media can improve their performance and service life.

The second distributor plates 10b, 10c (etc.) preferably have the same general features and characteristics as the first distributor plate 10a described above. In other words, they comprise thermoplastic polymeric disks 20 having a top side 30, a bottom side 40, a perimeter edge 50 and a central opening 60, which are provided with radial slits 70 that define fluid flow passages through the disk 20 between the central opening 60 and the perimeter edge 50. One difference, however, is that the diameter of the central opening in the second distributor plates 10b, 10c (etc.) must be sufficiently larger than the diameter of the supply pipe 170 in order to facilitate disposing water treatment media past the second distributor plates 10b, 10c (etc.) such that it can be supported by the first distributor plate 10a (and/or lower second distributor plates). Once the water treatment media has passed the second distributor plates 10b, 10c (etc.), adapters can be installed to close the gap or open space between the supply pipe 170 and the central opening in the second distributor plates 10b, 10c (etc.).

Figure 5:
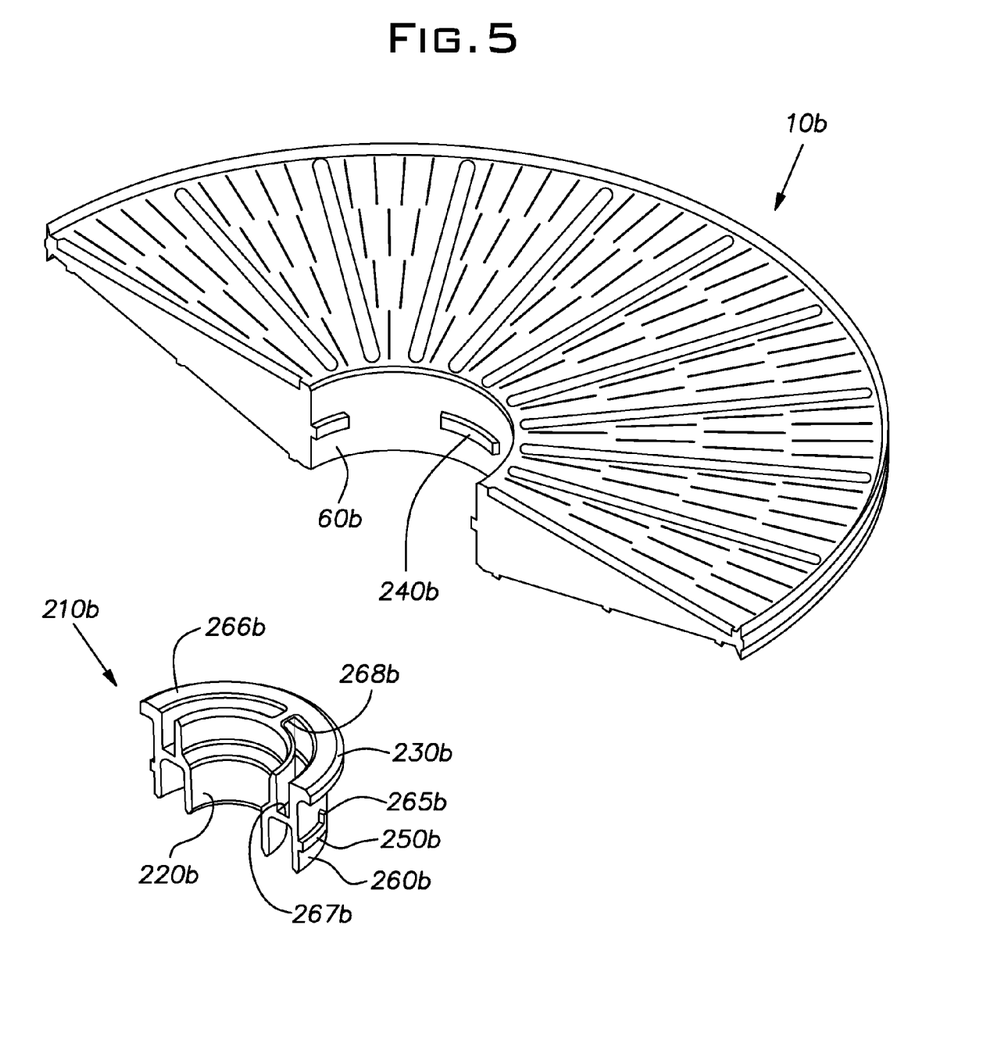
FIG. 5 is an exploded perspective front section view taken through the center of one exemplary adapter and corresponding second distributor plate according to the present invention.

FIG. 5 shows an exploded perspective front section view taken through the center of an exemplary adapter 210b and corresponding second distributor plate 10b according to the present invention. The adapter 210b includes an axial opening 220b that is dimensioned to sealingly surround the supply pipe 170 (shown in FIG. 7) and an outer perimeter portion 230b that is adapted to cover and thereby close off the gap or open space between the supply pipe 170 and the central opening 60b in the second distributor plate 10b through which the water treatment media can pass during a filling operation.

In the embodiment illustrated in FIG. 5, the second distributor plate 10b includes a plurality of discontinuous raised thread sections 240b disposed in the central opening 60b. The raised thread sections 240b preferably lie in a plane that is parallel to the top side 30b of the second distributor plate 10b and bisects the height of the collar. The adapter 210b also includes a plurality of discontinuous raised thread sections 250b, which extend from an outer portion 260b of adapter 210b. The discontinuous thread sections 250b formed on the adapter 210b are adapted to pass between and slightly past the discontinuous thread sections 240b formed on the second distributor plate 10b. Rotation of the adapter 210b relative to the second distributor plate 10b causes the raised thread sections 250b to pass over the raised thread sections 240b, thereby locking the adapter 210b to the second distributor plate 10b. A stop 265b can be formed on the raised thread sections 250b (or the 240b) to limit rotation of the adapter 210b with respect to the second distributor plate 10b.

A top portion 266b of the adapter 210b preferably defines an annular channel 267b, which is interrupted by vertical segments 268b. This structure facilitates locking the adapter 210b to the second distributor plate 10b through the use of a tool (not shown) having prongs that extend into the annular channel 267b.

In the embodiment shown in FIG. 5, the central opening 60b in the second distributor plate 10b is relatively large in diameter. Accordingly, the adapter 210b is also correspondingly large in diameter. To strengthen the adapter 210b, a double-wall construction can be utilized, with an inner wall defining the axial opening 220b and the outer wall defining the outer portion 260b of the second adapter 210b.

Figure 6:
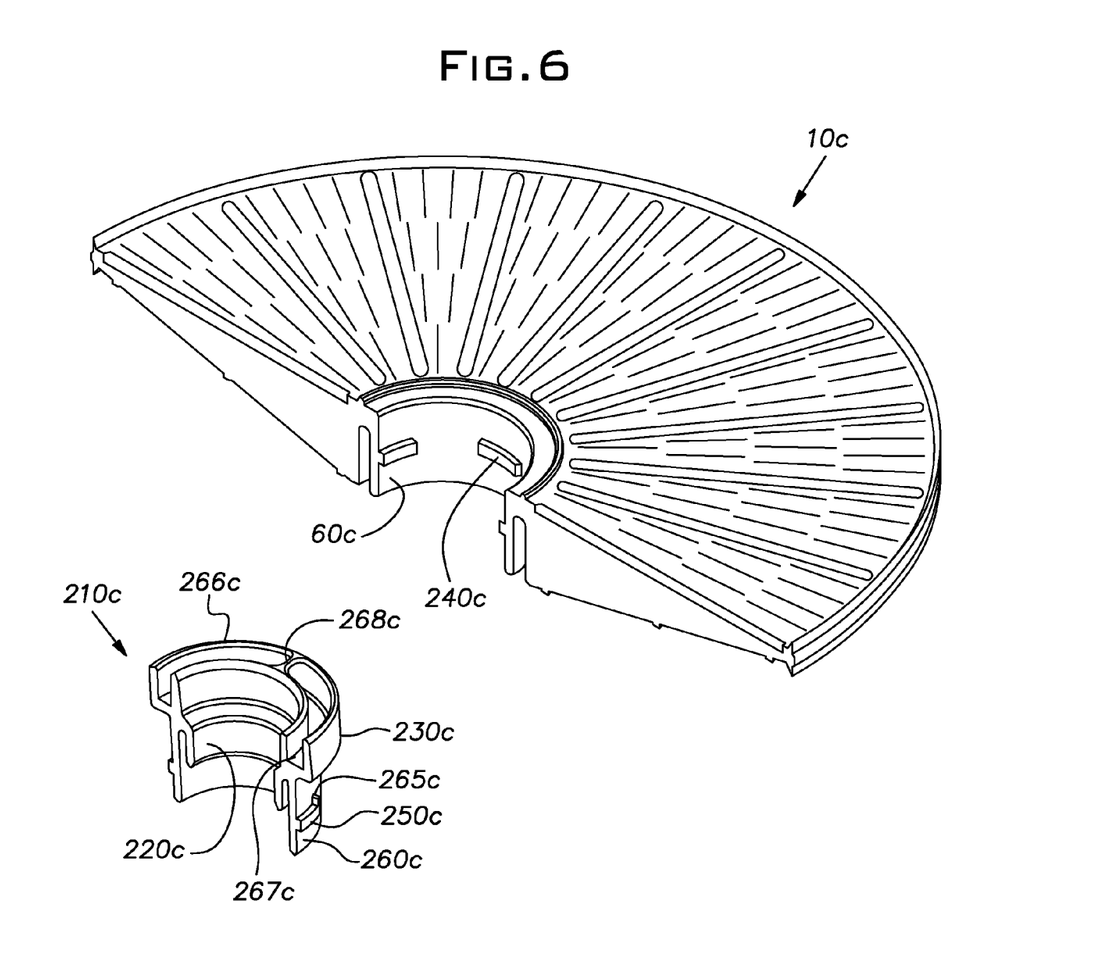
FIG. 6 is an exploded perspective front section view taken through the center of another exemplary adapter and corresponding second distributor plate according to the present invention.

FIG. 6 shows an exploded perspective front section view taken through the center of an alternative embodiment of an adapter 210c and corresponding second distributor plate 10c according to the present invention. Like reference numbers are used to identify similar elements ("c" is used instead of "b"). In the embodiment shown in FIG. 6, the central opening 60c in the second distributor plate 10c is smaller in diameter than the central opening 60b in the second distributor plate 10b shown in FIG. 5, but larger than the diameter of the supply pipe 170. Adapter 210c can pass through the central opening 60b in second distributor plate 10b. However, the top portion 266c of the adapter 210c preferably defines an annular channel 267c interrupted by vertical segments 268c that is the same size as the annular channel 267b in the adapter 210b shown in FIG. 5. Thus, the same tool used to lock adapter 210b to second distributor plate 10b can be used to lock adapter 210c to second distributor plate 10c.

The perimeter edge of second distributor plates 10b, 10c (etc.) preferably has a flat profile in cross-section to maximize the contact between the perimeter edge and the inner side wall 200 of the thermoplastic cylinder during spin-welding. In some instances, small bumps may be provided on the perimeter edge in a spaced apart relationship to facilitate sliding the second distributor plates 10*b*, 10*c* through the thermoplastic cylinder 130 to the desired installation position. The small bumps rapidly heat up, melt and become part of the melt-fusion bond between the perimeter edge of the additional distributor plates 10*b*, 10*c* and the inner side wall 200 of the thermoplastic cylinder 130 during spin-welding. Such bumps are not necessary when the distributor plates 10*b*, 10*c* are secured to the thermoplastic cylinder 130 via laser welding.

The distributor plates are preferably formed of a thermoplastic polymer that is suitable for spin-welding and/or laser welding applications. Olefin polymers such as polypropylene, polyethylene and particularly copolymers thereof are preferred for use in the invention. The snap-fitting 160 and/or the adapter(s) 210 can also be formed of the same material, but can also be formed of other corrosion resistant polymeric materials, if desired.

FIG. 7 shows a cross-section view of an exemplary water treatment vessel 270*a* according to one embodiment of invention. The water treatment vessel 270*a* comprises a thermoplastic liner 280 in the form of a thermoplastic cylinder 130 having a first thermoplastic domed end cap 120 spin-welded to a first end thereof and a second thermoplastic domed end cap 290 spin-welded to a second end thereof. A reinforcing layer 300 covers the thermoplastic liner 280. The reinforcing layer 300 comprises a plurality of glass filaments that are wrapped helically and circumferentially around the thermoplastic liner. The glass filaments are preferably coated with a thermosetting epoxy resin composition. The thermosetting epoxy resin composition consolidates the glass filaments and bonds the same to the thermoplastic liner when cured.

A first distributor plate 10*a* is spin-welded to the first domed end cap 120 of the thermoplastic liner 280 before the end cap 120 is spin-welded to the thermoplastic cylinder 130. The first distributor plate 10*a* comprises a thermoplastic polymeric disk having a top side, a bottom side, a perimeter edge and a central opening. Radial slits are formed in the disk to define fluid flow passages through the disk between the central opening and the perimeter edge. The fluid flow passages through the disk are adapted to swirl fluid flowing through the disk from the bottom side to the top side around the central opening. The fluid flow is shown by arrows 80.

The water treatment vessel 270*a* according to the invention further comprises a supply pipe 170 having a fitting attached at a first end thereof, wherein the fitting engages with and is thereby retained by an upper retaining ring formed in the central opening in the first distributor plate. A second end 310 of the supply pipe 170 is accessible through an aperture 320 formed in the second domed end cap 290. The second end 310 of the supply pipe 170 can be connected to a valve assembly (not shown), which includes means for directing water into the vessel to flow through the water treatment media and distributor plate(s) and then up through the supply pipe 170.

In a preferred embodiment of the invention, the water treatment vessel further comprises one or more second distributor plates 10*b*, 10*c*. Each one of the second distributor plates preferably comprises a second thermoplastic disk having top side, a bottom side, a central opening and a perimeter edge that is spin-welded to the cylindrical side wall of the thermoplastic liner. As in the case of the first distributor plate, a plurality of radial slits are formed in the second disk to define fluid flow passages through the second disk between the central opening and the perimeter edge. The fluid flow passages through the second disk are adapted to swirl fluid flowing through the second disk from the bottom side to the top side about the central opening. The fluid flow can be in the same direction as the fluid flow from the first distributor plate, or can be counter to the flow. To facilitate the passage of water treatment media past the second distributor plate, the central opening in the second disk has a larger diameter than the outer diameter of the supply pipe. The gap or open space between the central opening in the second disk and the supply pipe is closed off using an adapter that is smaller in diameter than the aperture formed in the second domed end cap. The adapter includes an axial opening that is dimensioned to sealingly surround the supply pipe and a perimeter edge that is adapted to removable engage with the central opening in the second disk and thereby close off the gap or space. Thus, a first water treatment media is supported by the first distributor plate and a second water treatment media is supported by the second distributor plate. The media can be the same or different materials.

Figure 8:
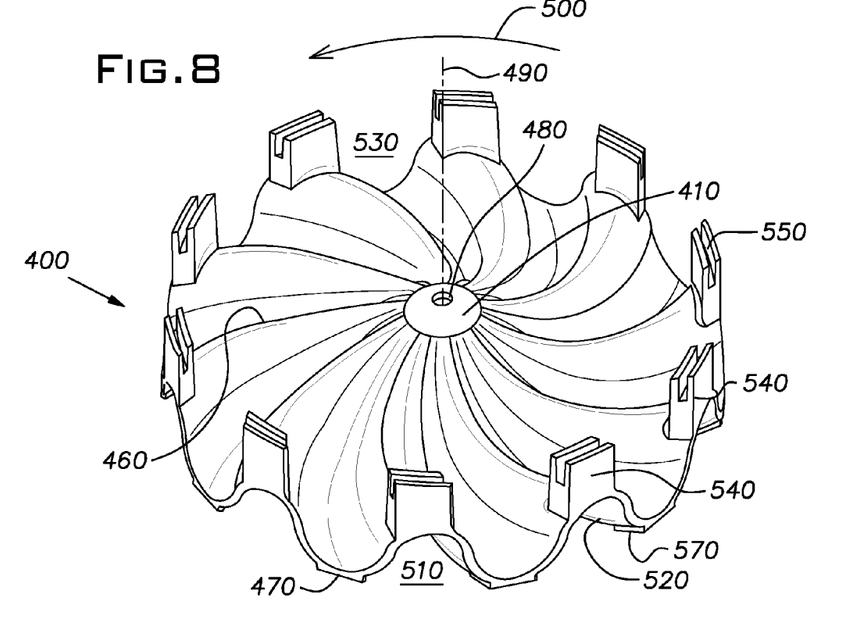
FIG. 8 is a perspective view of an exemplary flow-control support according to the invention.

FIG. 8 shows an exemplary flow control support 400 according to the invention. With reference to FIGS. 8-11, the flow-control support 400 includes a spirally fluted upper surface 410 that is adapted to direct fluid flowing from a supply pipe 170 disposed in the central opening 60 of a distributor plate 10*a* that is supported by the flow control support 400 such that at least a portion of the fluid swirls in a space 420 between the bottom side 40 of the distributor plate 10*a* and an inner side 430 of an end portion 440 of a water treatment vessel 450. The spirally fluted upper surface 410 of the flow control support 400 preferably includes a plurality of peaks 460 and a corresponding plurality of troughs 470 that spiral counter-clockwise from an opening 480 provided through the spirally fluted upper surface 410. The opening 480 is preferably disposed beneath an axis 490 defined by the axis of the supply pipe 170. Thus, a first portion of fluid pumped out of the supply pipe 170 is able to pass through the opening 480 in the spirally fluted upper surface 410 of the flow control support 400 while a second portion of fluid pumped out of the supply pipe 170 is caused to contact the spirally fluted upper surface 410 of the flow control support 400, which causes it to swirl in a counter-clockwise direction indicated by arrow 500. The first portion of fluid (i.e., the portion flowing through the opening 480) exits from beneath the flow control support 400 through gaps 510 between the bottom side 520 of the flow control support 400 and the inner side 430 of the end portion 440 of the water treatment vessel 450. Some of the second portion of fluid (i.e., the portion contacting the spirally fluted upper surface 410 of the flow control support 400) exits from the space 420 through gaps 530 between the spirally fluted upper surface 410 of the flow control support 400 and the bottom side 40 of the distributor plate 10*a*.

Figure 10:
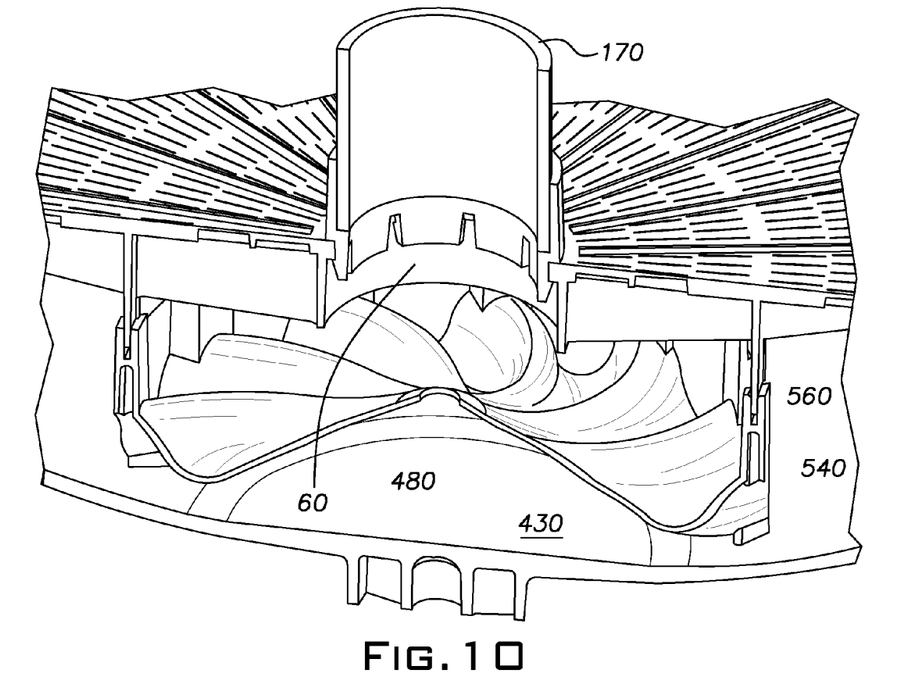
FIG. 10 is an enlarged perspective view of a portion of the section shown in FIG. 9.
Figure 11:
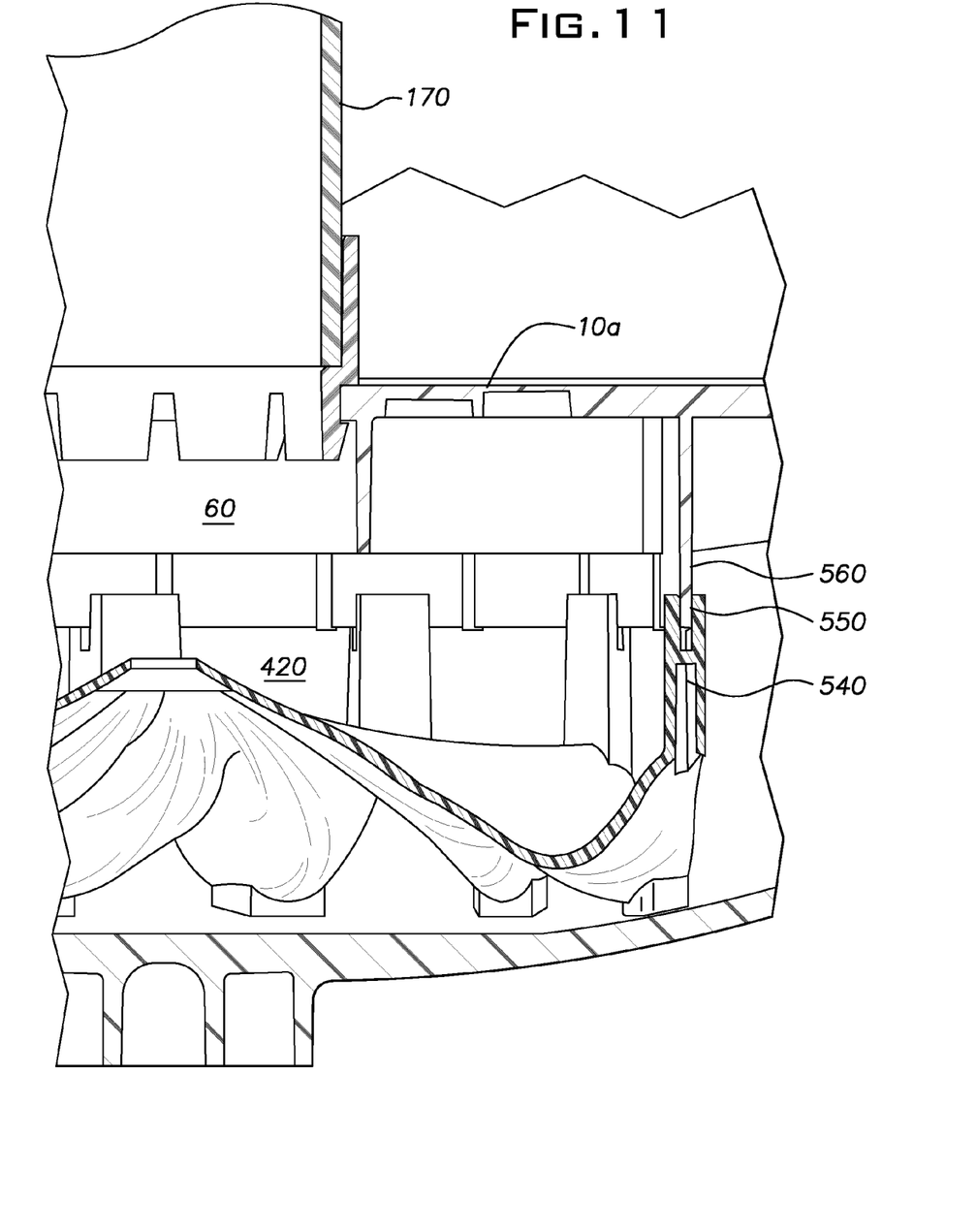
FIG. 11 is a side view of the portion of the section shown in FIG. 10.

Preferably, a plurality of support members 540 extend from the peaks 460, which increases the size of the gaps 530. The number of support members 540 is not per se critical, but a number within the range of 6 and 14 is presently preferred. Each of the plurality of support members 540 preferably includes a groove 550 for receiving a fin 560 extending from the bottom side 40 of the distributor plate 10*a*. The fin 560 could be a radial reinforcing fin 140, such as previously described. Or, the fin 560 can be a ring structure such as shown in FIGS. 10 and 11. The support members 540 can be, but need not be, bonded to the fins 140 or 560 before the perimeter 50 of the distributor plate 10*a* is secured to inner side 200 of the water treatment vessel 450. More preferably, the support members 540 clip to the fins 140 or 560 before the perimeter 50 of the distributor plate 10*a* is secured to inner side 200 of the water treatment vessel 450. The flow control support 400 also preferably includes a plurality of feet 570 that contact the inner side 430 of the end portion 440 of the water treatment vessel 450.

During normal operations, the flow control support 400 supports the distributor plate 10*a* and prevents it from deflecting toward the inner side 430 of the end portion 440 of the water treatment vessel 450. The use of a flow control support 400 is advantageous, particularly in water treatment vessels 450 having a large diameter (e.g., 16" or greater) that include a large volume of water treatment media.

During backwashing operations, the flow control support 400 causes the fluid flowing from the supply pipe 170 to swirl, preferably in a counter-clockwise manner. The swirling fluid reduces turbulence and insures that fluid is distributed to substantially all of the fluid flow passages through the disk 20 during backwashing operations. The opening 480 assures that there are no "dead zones" or "slugs" of fluid that are not exchanged during normal and backwashing operations. The flow control support 400 is preferably formed of injection molded polypropylene. However, other materials may be used, if desired.

Figure 9:
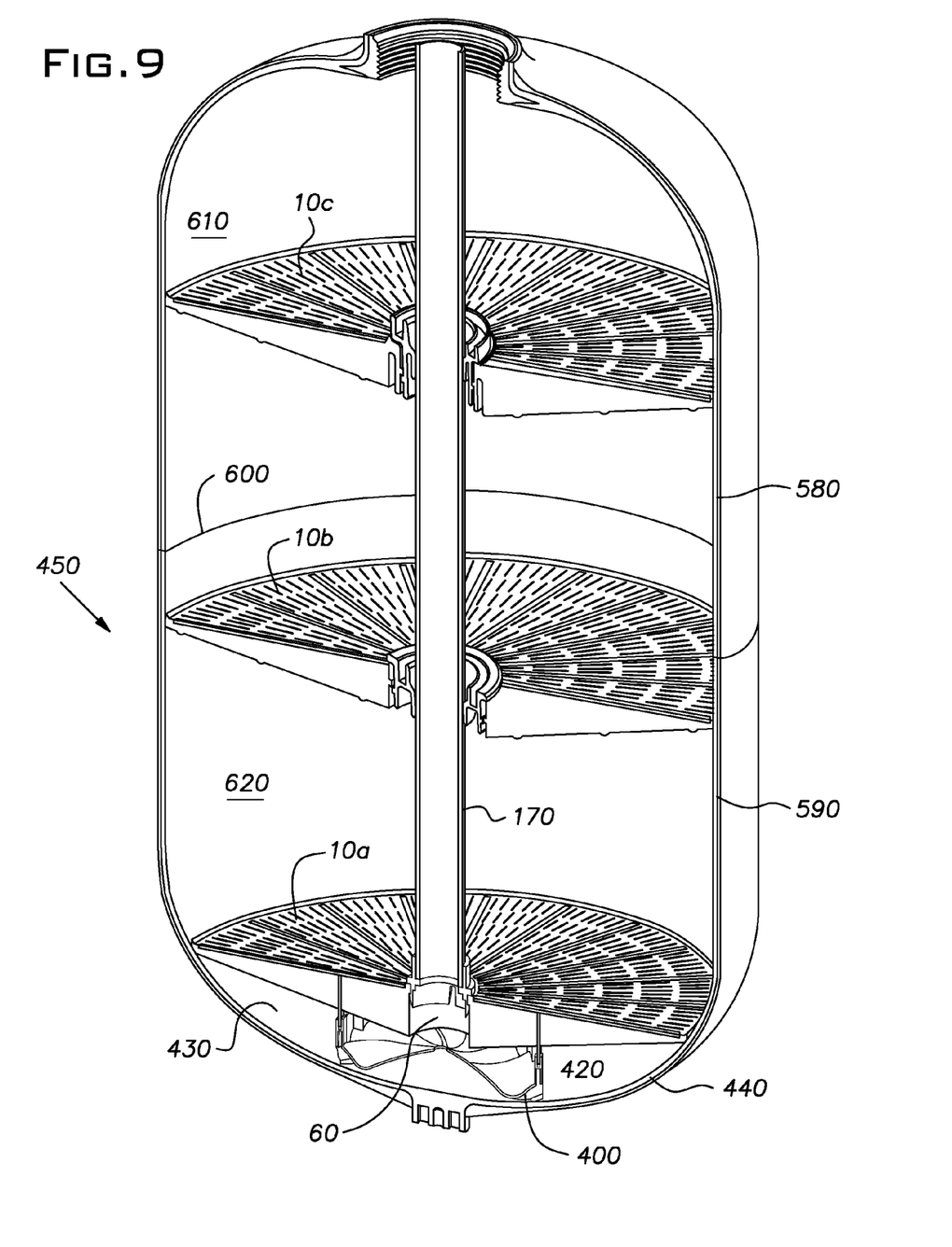
FIG. 9 is a perspective view showing the front of a section taken through the longitudinal axis of an exemplary composite pressure vessel including the flow-control support shown in FIG. 8.

It will be appreciated that the flow-control support 400 can only be used between the inner side 430 of the end portion 440 of the water treatment vessel 450 and one distributor plate 10a. However, the water treatment vessel may, but need not, include additional distributor plates 10b, 10c, such as illustrated in FIG. 9 and as previously described with respect to FIG. 7. It will also be appreciated that while the use of a distributor plate 10a provided with radial slits 70 is considered optimal, the distributor plate 10a could be provided with other types of fluid flow passages (e.g., grids or screens).

The present invention also provides methods for manufacturing composite pressure vessels. In accordance with a first method of the invention, a flow control support is associated with a first thermoplastic distributor plate to form an assembly. The assembly is then spin-welded to a first thermoplastic domed end cap. Preferably, the first distributor plate comprises a thermoplastic polymeric disk having a top side, a bottom side, a perimeter edge and a central opening. Radial slits are preferably formed in the disk to define fluid flow passages through the disk between the central opening and the perimeter edge. The fluid flow passages through the disk are preferably adapted to swirl fluid flowing through the disk from the bottom side to the top side around the central opening. Drive lugs are preferably formed in the top side of the first distributor plate, which receive fins extending from a chuck plate attached to a spin-welding machine. Rotation of the chuck plate rapidly spins the first distributor plate and flow control support assembly temporarily while the perimeter edge of the first distributor plate is frictionally contacting the inner surface of the first domed end cap. The friction creates local heating, which melt-fuses the two parts together. The perimeter of the first distributor plate is completely fused to the inner side of the first thermoplastic end cap, with the feet of the flow control support in contact with or very close to the inner side of the first thermoplastic end cap. Once the first distributor plate has been spin-welded to the first domed end cap, the first domed end cap is spin welded to a first end of the thermoplastic cylinder, and a second thermoplastic domed end cap is spin-welded to a second end of the thermoplastic cylinder to form a thermoplastic liner assembly. It will be appreciated that laser-welding could be used instead of spin-welding, if desired. The thermoplastic liner assembly is then be wrapped with a reinforcing overwrap layer comprising glass filaments, which are preferably coated with a thermosetting epoxy composition. The glass filaments are wrapped helically and circumferentially around the thermoplastic liner assembly. After the thermosetting epoxy composition has been cured, a supply pipe having a fitting attached at a first end thereof is inserted through an aperture formed in the second domed end cap until the fitting engages with and is retained by an upper retaining ring formed in the central opening of the first distributor plate.

In some instances, it will be advantageous for one or more second distributor plates to be installed within the composite pressure vessel. This can be accomplished by spin-welding or laser-welding one or more second distributor plates to a cylindrical side wall of the thermoplastic cylinder before the first domed end cap is spin welded or laser-welded to the first end thereof. In a spin-welding operation, the thermoplastic cylinder is held stationary, and the second distributor plates are temporarily, rapidly spun while their perimeter edges are in frictional contact with the inner side walls of the thermoplastic cylinder. The second distributor plate preferably comprises a second disk having top side, a bottom side, a central opening and the perimeter edge that is spin-welded to the cylindrical side wall of the thermoplastic cylinder. The second distributor plate preferably includes a plurality of radial slits that define fluid flow passages through the second disk between the central opening and the perimeter edge. As in the case of the first distributor plate, the fluid flow passages through the second disk are adapted to swirl fluid flowing through the second disk from the bottom side to the top side about the central opening.

Alternatively, a water treatment vessel 450 can be constructed by joining a first vessel portion 580 to a second vessel portion 590 at a joint 600. The first vessel portion 580 and the second vessel portion 590 can be separately molded or can be formed by dividing a blow-molded or rotationally molded thermoplastic tank in two. One or more distributor plates 10c can but need not be joined to the inner side 610 of the first vessel portion 580 via spin-welding or laser-welding. At least one distributor plate 10a having a flow control support 400 associated with a bottom side 40 thereof must be joined to an inner side 620 of the second vessel portion 590 via spin-welding or laser welding. Additional distributor plates 10b can also be joined to the inner side 620 of the second vessel portion 590, if desired. Once the distributor plate 10a and any optional distributor plates 10b, 10c (etc.) have been joined to the inner sides 610, 620 of the first and second vessel portions 580, 590, the first vessel portion 580 and the second vessel portion 590 can be joined together at the joint 600 by spin-welding or laser-welding, as is known in the art. A reinforcing layer can be wrapped helically and circumferentially around the resulting structure, which is then preferably coated with a thermosetting epoxy resin composition as described above.

The present invention also provides a method for preparing a composite pressure vessel for use as a water treatment apparatus. In accordance with the method, a composite pressure vessel having at least a first distributor plate supported by a flow control support is provided. The composite pressure vessel also includes a supply pipe having a fitting attached at a first end thereof. The fitting is engaged with and is thereby retained by an upper retaining ring formed in a central opening in the first distributor plate. A second end of the supply pipe is accessible through an aperture formed in the composite pressure vessel. In accordance with the method, a first water treatment media is disposed through the aperture into the composite pressure vessel such that the first water treatment media is supported by the first distributor plate.

In a preferred embodiment, the composite pressure vessel includes one or more second distributor plates, each comprising a second disk having top side, a bottom side, a central opening and a perimeter edge that have been spin-welded or laser-welded to the cylindrical side wall of the composite pressure vessel. As in the case of the first distributor plate, a plurality of radial slits are preferably formed in the second disk to define fluid flow passages through the second disk between the central opening and the perimeter edge. The central opening in the second disk has a larger diameter than the outer diameter of the supply pipe, thereby leaving a gap or open space between the central opening and the supply pipe. The water treatment media is introduced into the vessel such that it passes through the gap or open space and is supported on the first distributor plate. Then, an adapter that is smaller in diameter than the aperture formed in the second domed end cap is slid over the supply pipe such that an axial opening in the adapter sealingly surrounds the supply pipe. The adapter is slid down the supply pipe until a perimeter edge of the adapter covers or removably engages with the central opening in the second disk, closing off the gap or open space. A second water treatment media is then disposed through the aperture in the composite pressure vessel such that the second water treatment media is supported by the second distributor plate.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A flow control support for a distributor plate disposed within a composite pressure vessel, the flow control support comprising:
   a disk having a spirally fluted upper surface;
   a plurality of support members extending from the disk for supporting a bottom side of the distributor plate above the spirally fluted upper surface of the disk; and
   a plurality of feet provided on a side opposite the spirally fluted upper surface of the disk for contacting an inner side of an end portion of the composite pressure vessel;
   wherein an axial opening is provided through the disk.

2. The flow control support according to claim 1 wherein the spirally fluted upper surface of the flow control support is adapted to direct fluid flowing from a supply pipe disposed in a central opening of the distributor plate above the axial opening such that at least a portion of the fluid flowing from the supply pipe swirls in a space between the bottom side of the distributor plate and the inner side of the end portion of the composite pressure vessel.

3. The flow control support according to claim 2 wherein the spirally fluted upper surface of the flow control support is adapted to swirl the fluid flowing from the supply pipe in a counter clockwise direction relative to the upper surface of the flow control support and about the central opening of the distributor plate.

4. The flow control support according to claim 3 wherein a first portion of the fluid flowing from the supply pipe is adapted to pass through the axial opening at the same time as a second portion of fluid flowing from the supply pipe contacts the spirally fluted upper surface of the flow control support.

5. The flow control support according to claim 4 wherein the first portion of fluid that passes through the axial opening is adapted to exit from beneath the flow control support through gaps between a bottom side of the flow control support and the inner side of the end portion of the composite pressure vessel.

6. The flow control support according to claim 4 wherein the second portion of fluid that contacts the spirally fluted upper surface of the flow control support is adapted to exit from the space through gaps between the bottom side of the distributor plate and the spirally fluted upper surface of the flow control support.

7. The flow control support according to claim 1 wherein the plurality of support members extend from peaks in the spirally fluted upper surface of the disk.

8. The flow control support according to claim 1 wherein the plurality of support members each include a groove for receiving a fin extending from the bottom side of the distributor plate.

9. A water treatment vessel comprising:
   a hollow thermoplastic liner having an inner side and a first end portion;
   a reinforcing layer covering the hollow thermoplastic liner, the reinforcing layer comprising a plurality of glass filaments wrapped helically and circumferentially around the hollow thermoplastic liner; and
   a first distributor plate comprising a first plate having a top side, a bottom side, a central opening, a perimeter edge and a plurality of fluid flow passages through the first plate, the perimeter edge being welded to the inner side of the thermoplastic liner proximal to the first end portion;
   a flow control support for the first distributor plate, the flow control support comprising:
   a disk having a spirally fluted upper surface;
   a plurality of support members extending from the disk for supporting the bottom side of the first distributor plate above the spirally fluted upper surface of the disk; and
   a plurality of feet provided on a side opposite the spirally fluted upper surface of the disk for contacting the inner side of the first end portion of the hollow thermoplastic liner and
   a supply pipe disposed in the central opening of the distributor plate above the disk.

10. The water treatment vessel according to claim 9 wherein an axial opening is provided through the disk.

11. The water treatment vessel according to claim 10 wherein the spirally fluted upper surface of the flow control support is adapted to swirl a backwashing fluid flowing out of the supply pipe in a counter clockwise direction relative to the upper surface of the flow control support and about the central opening of the distributor plate in a space between the bottom side of the distributor plate and the inner side of the first end portion of the hollow thermoplastic liner.

12. The water treatment vessel according to claim 11 wherein a first portion of the backwashing fluid flowing from the supply pipe is adapted to pass through the axial opening at the same time as a second portion of backwashing fluid flowing from the supply pipe contacts the spirally fluted upper surface of the flow control support.

13. The water treatment vessel according to claim 12 wherein the first portion of the backwashing fluid that passes through the axial opening is adapted to exit from beneath the flow control support through gaps between a bottom side of the flow control support and the inner side of the first end portion of the hollow thermoplastic liner.

14. The water treatment vessel according to claim 12 wherein at least some of the second portion of backwashing fluid that contacts the spirally fluted upper surface of the flow control support is adapted to exit from the space through gaps between the bottom side of the distributor plate and the spirally fluted upper surface of the flow control support.

15. The water treatment vessel according to claim 9 wherein the first distributor plate is adapted to support a first water treatment media.

16. The water treatment vessel according to claim 15 wherein the plurality of fluid flow passages through the first distributor plate are adapted to swirl a backwashing fluid in a counter-clockwise direction relative to the top side of the first distributor plate and about the central opening in the first distributor plate.

17. The water treatment vessel according to claim 15 further comprising a second distributor plate comprising a second plate having a top side, a bottom side, a central opening, a perimeter edge and a plurality of fluid flow passages through the second plate, the perimeter edge being welded to the inner side of the thermoplastic liner above the first distributor plate.

18. The water treatment vessel according to claim 17 wherein the second distributor plate is adapted to support a second water treatment media that is different than the first water treatment media and wherein the plurality of fluid flow passages through the second distributor plate are adapted to swirl the backwashing fluid in a counter-clockwise direction relative to the top side of the second distributor plate and about the central opening in the second distributor plate.

19. The water treatment vessel according to claim 9 wherein the plurality of fluid flow passages through the first plate comprise slits provided in a radial pattern about the central opening.

20. The water treatment vessel according to claim 9 wherein the flow control support is formed of polypropylene.

* * * * *